(12) United States Patent
Zlatintsis

(10) Patent No.: US 11,376,455 B2
(45) Date of Patent: Jul. 5, 2022

(54) CONTROL SYSTEM FOR A FIRE-EXTINGUISHING INSTALLATION, AND SAFETY DEVICE

(71) Applicant: Minimax GmbH, Bad Oldesloe (DE)

(72) Inventor: Chrysafis Zlatintsis, Neumünster (DE)

(73) Assignee: Minimax GmbH, Bad Oldesloe (DE)

( * ) Notice: Subject to any disclaimer, the term of this patent is extended or adjusted under 35 U.S.C. 154(b) by 0 days.

(21) Appl. No.: 16/324,082

(22) PCT Filed: Aug. 8, 2017

(86) PCT No.: PCT/EP2017/070099
§ 371 (c)(1),
(2) Date: Feb. 7, 2019

(87) PCT Pub. No.: WO2018/029206
PCT Pub. Date: Feb. 15, 2018

(65) Prior Publication Data
US 2019/0168044 A1  Jun. 6, 2019

(30) Foreign Application Priority Data

Aug. 9, 2016 (DE) .................... 10 2016 214 788.9

(51) Int. Cl.
*A62C 35/64* (2006.01)
*A62C 35/68* (2006.01)
(Continued)

(52) U.S. Cl.
CPC .............. *A62C 35/64* (2013.01); *A62C 35/68* (2013.01); *A62C 37/00* (2013.01); *F16K 15/04* (2013.01); *F16K 31/084* (2013.01)

(58) Field of Classification Search
CPC ....... A62C 35/64; F16K 15/04; F16K 31/084; Y10T 137/7866
See application file for complete search history.

(56) References Cited

U.S. PATENT DOCUMENTS 2,091,058 A * 8/1937 Thompson .............. F16K 15/04
137/533.13
2,569,316 A * 9/1951 Jerman ................... F16K 15/04
137/517

(Continued)

FOREIGN PATENT DOCUMENTS

DE          1 809 001         6/1970
DE    10 2012 004 845 A1    9/2013
(Continued)

OTHER PUBLICATIONS

International Searching Authority, International Search Report in German & English translation in International Appln. No. PCT/EP2017/070099, dated Sep. 29, 2017, 7 pages.

*Primary Examiner* — Reinaldo Sanchez-Medina
*Assistant Examiner* — Nicole Gardner
(74) *Attorney, Agent, or Firm* — Perkins Coie LLP

(57) ABSTRACT

The invention relates to a control system (10) of a fire-extinguishing installation, having at least one control line (11) for controlling a controlling procedure of the fire-extinguishing installation, wherein the control line (11) in a passive operation is unpressurized and the control line (11) in a control operation is impinged with a control pressure, and a safety device (12), fluidically connected to the control line (11), having a pressure equalization chamber (13) in which a holding element (3) and a movable closure element (2) are disposed.
It is proposed that the closure element (2) is disposed in the pressure equalization chamber (13) so as to be displaceable between a first terminal position and a second terminal position, and the holding element (3) is configured for exerting on the closure element (2) a restoring force in the direction of the first terminal position, wherein the restoring force on the closure element (2) in the second terminal position of the closure element (2) is higher than the weight (Continued)

force of the closure element (2), and in the first terminal position of the closure element (2) is lower than a pressure force that in the control operation acts as a function of the control pressure on the closure element (2).

19 Claims, 1 Drawing Sheet

(51) Int. Cl.
    *A62C 37/00*     (2006.01)
    *F16K 15/04*     (2006.01)
    *F16K 31/08*     (2006.01)

(56) References Cited

U.S. PATENT DOCUMENTS

| | | | | |
|---|---|---|---|---|
| 2,597,952 | A * | 5/1952 | Rosenlund | F16K 15/04 137/528 |
| 2,939,475 | A * | 6/1960 | Roach | F16K 31/084 137/155 |
| 3,026,903 | A * | 3/1962 | Roach | F16K 15/04 137/533.13 |
| 3,159,167 | A * | 12/1964 | Mueller | F16K 17/285 137/71 |
| 3,272,211 | A * | 9/1966 | Leopold, Jr. | F16L 41/04 137/15.13 |
| 3,921,662 | A * | 11/1975 | Hauffe | F16K 17/285 137/517 |
| 5,280,806 | A * | 1/1994 | Glazebrook | F16K 17/285 137/517 |
| 9,745,824 | B2 * | 8/2017 | Veit | E21B 34/10 |
| 10,426,983 | B2 * | 10/2019 | Hennegan | A62C 37/36 |
| 2004/0194977 | A1 | 10/2004 | Stilwell et al. | |
| 2006/0000511 | A1 | 1/2006 | Shade et al. | |
| 2011/0192701 | A1 * | 8/2011 | Schulller | F16K 17/30 192/85.63 |

FOREIGN PATENT DOCUMENTS

| | | | |
|---|---|---|---|
| EP | 2647433 | 10/2013 | |
| EP | 2 696 116 A1 | 2/2014 | |
| EP | 2 857 735 A1 | 4/2015 | |
| GB | 744858 A * | 2/1956 | F16K 31/084 |
| WO | WO 98/57082 A1 | 12/1998 | |
| WO | WO 2004/016974 | 2/2004 | |

* cited by examiner

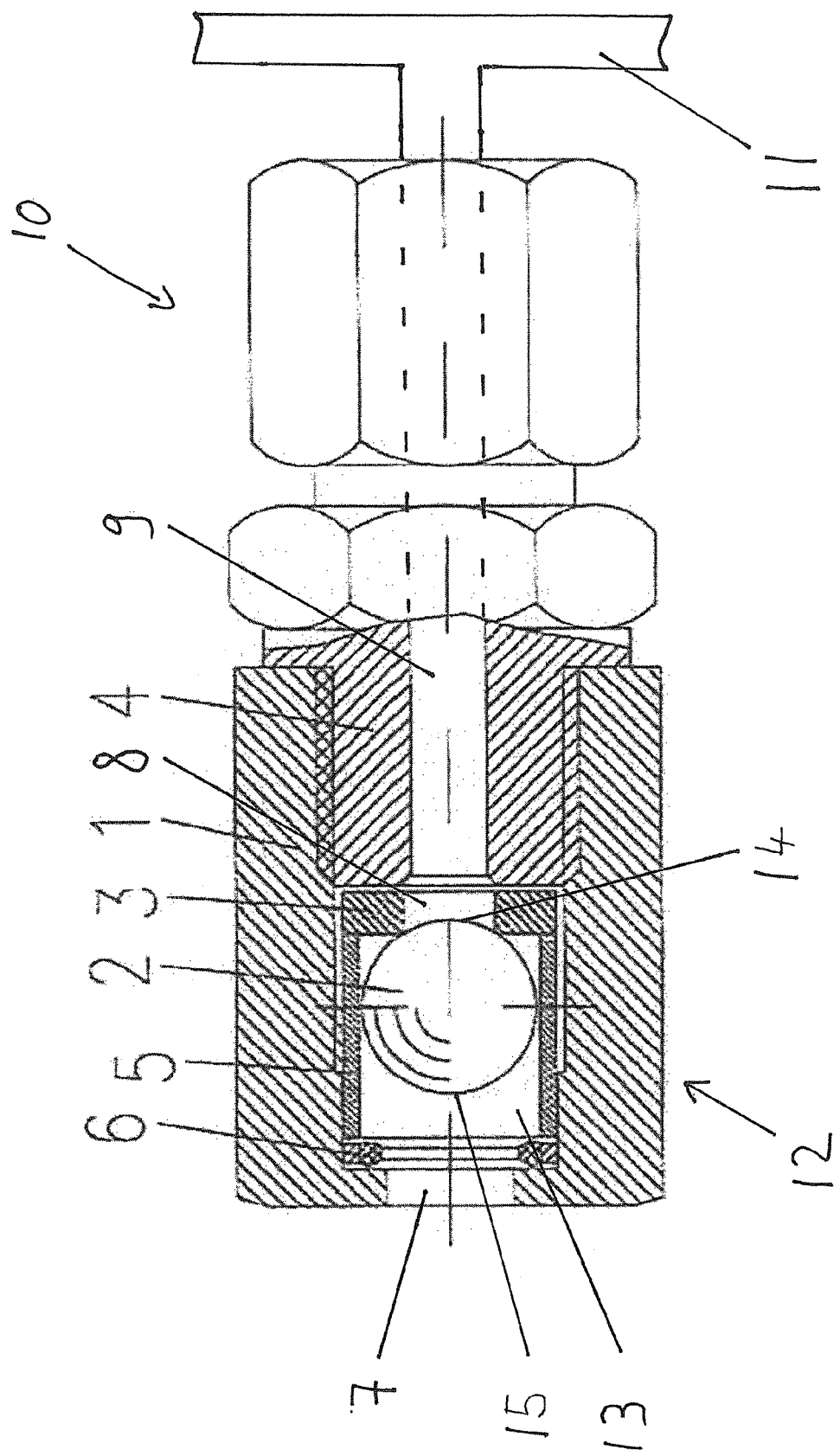

CONTROL SYSTEM FOR A FIRE-EXTINGUISHING INSTALLATION, AND SAFETY DEVICE

PRIORITY CLAIM AND INCORPORATION BY REFERENCE

This application is a 35 U.S.C. § 371 application of International Application No. PCT/EP2017/070099, filed Aug. 8, 2017, which claims the benefit of German Application No. 10 2016 214 788.9 filed Aug. 9, 2016, each of which is incorporated by reference in its entirety.

TECHNICAL FIELD

The invention relates to a control system for a fire-extinguishing installation, as well as to a safety device therefor.

BACKGROUND AND SUMMARY OF THE INVENTION

Fire-extinguishing installations dispose of control systems and can be triggered by way of pneumatic or hydraulic actuators. The actuators herein are supplied by closed pressure accumulators which are opened only when the actuating function is required, thus is to trigger the fire-extinguishing installation. Up to the point in time of the controlling procedure there should not be any pressure prevalent in the control lines which lead to the actuator.

However, the closed pressure accumulators can become leaky. On account thereof, it can arise that the control medium escapes from the pressure accumulator and a pressure is built up in a control line. If the pressure becomes sufficiently high, unintentional actuating and triggering of the installation can occur. It thus has always to be guaranteed that the control line in the operationally ready state is permanently unpressurized. By contrast, in the case of an actuation it has likewise to be guaranteed that the actuation pressure is maintained without loss of pressure in the control line. This task is assumed by safety devices.

Safety devices per se are known. One such safety device is a so-called faulty pressure safeguard. The latter, for example by way of a screw connection, is fluidically connected to a control line of the control system and comprises a closure element in a housing. When the control pressure is prevalent, the closure element for maintaining the control pressure seals an exit opening of the faulty pressure safeguard. However, if the control pressure is not prevalent, the closure element is disposed in the faulty pressure safeguard in such a manner that a potentially prevalent pressure which is lower than the control pressure can escape from the faulty pressure safeguard such that the control line is held so as to be unpressurized.

In order to guarantee the aforementioned functions, known faulty pressure safeguards inevitably have to be disposed so as to be upright and to be connected to the control line because the closure element disposed in the faulty pressure safeguard returns to the initial position thereof exclusively on account of the action of gravity. In the case of vibrating or oscillating applications it can additionally arise that the faulty pressure safeguard is loosened and the installed position thereof is modified. Under certain circumstances, this can even lead to a loss of function.

Other known solutions represent check valves. Check valves release a flow direction as soon as a pressure exerted in said direction by a fluid on a closure element exceeds a limit value. However, check valves are not configured for maintaining a pressure acting in the same direction.

Valves in which a closure member is opened by fluid pressure and is closed by means of different closure assemblies are furthermore known in the prior art for controlling pressure.

A valve for controlling the pressure for milk frothers is known from DE 10 2012 004 845 A1, said valves not requiring any external power supply. Such a valve has a movably mounted closure member and a valve inflow by way of which the closure member is capable of being impinged with a fluid flow. The valve inflow in the closed state of the valve is closed by the closure member. The valve inflow can be opened by moving the closure member away from the valve inflow, said movement being caused by a fluid pressure, such that a flow of the fluid through the valve is enabled, wherein an abrupt increase in the pressure target area on the closure member is performed when a predetermined fluid pressure in the valve inflow is exceeded.

Furthermore, EP 2 696 116 A1 relates to a bi-directional safety valve which in the case of a bi-directional conveyance of media in a pipe system can seal in both conveying directions. A sealing member of such a valve can be actuated, for example, by way of an electromagnet. Furthermore, WO 98/57082 relates to a valve which is opened by fluid pressure and is closed by means of a magnet. Such a valve is in particular specified for use in flow meters. Finally, DE 1809 001 A relates to a self-acting shut-off valve for use in conjunction with mobile heaters, said shut-off valve likewise having a magnetically activated valve member.

The present invention has thus been based on the object of overcoming as far as possible the above-mentioned disadvantages. In particular, a control system having a safety device is to be specified, said control system functioning independently of the installed position of the safety device(s).

The invention achieves the underlying object thereof by way of the features of the disclosed invention. Accordingly, a control system for a fire-extinguishing installation is proposed, said control system having at least one control line for controlling a control procedure of the fire-extinguishing installation, wherein the control line in a passive operation is unpressurized and the control line in a control operation is subjected to control pressure, and a safety device, in fluid communication with the control line, having a pressure equalization chamber in which a holding element and a movable closure element are disposed, wherein the closure element is disposed in the pressure equalization chamber so as to be displaceable between a first terminal position and a second terminal position, and the holding element is configured for exerting on the closure element a restoring force in the direction of the first terminal position, wherein the restoring force acting on the closure element in the second terminal position of the closure element is higher than the weight force of the closure element, and in the first terminal position of the closure element is lower than a pressure force that during the control operation act on the closure element as a function of the control pressure.

The invention accordingly provides that a force which is directed in the direction of the resting position, or the first terminal position, respectively, acts on the closure element in each installed position of the safety device, thus when upright, lying, and even inverted, said force however in the control operation permitting the displacement of the closure element to the second terminal position. It is particularly advantageous as compared to the prior art herein that the positioning of the closure element is not performed exclusively by way of the effect of gravity but by way of the force which is exerted by the holding element on the closure element. The restoring force thus permits that the restoring force in the case of a prevailing control pressure is lower than the pressure force initiated by the control pressure such that the closure element for sealing and maintaining the control pressure is capable of being displaced to the second terminal position. The control pressure herein can be chosen in an arbitrary manner while taking into account the designed strength of the line system. For example, said control pressure can be up to 300 bar. However, in the absence of a prevalent control pressure, the closure element by virtue of the restoring force is displaced back to the first terminal position.

In one embodiment of the control system according to the invention the holding element has a magnet, and the closure element is at least in part configured so as to be magnetic or capable of being magnetized. The closure element is preferably composed of a material that is attracted by a magnetic force, for example of steel or a steel alloy, for example ferritic stainless steel. A magnetic force as the restoring force is thus configured between the holding element and the closure element. The magnetic force acts only by virtue of the prevailing magnetic field, in a manner independent of the alignment of the holding element, and therefore also when the safety device in an extreme case is installed so as to be inverted. The restoring force thus also acts counter to gravity on the closure element. The effect of the restoring force is thus independent of the installed position of the safety device.

One design embodiment of the control system provides that a housing of the safety device has an inlet opening located between the pressure equalization chamber and the control line. For example, if an unwanted pressure is established in the control line, said pressure not corresponding to the control pressure for actuating the fire-extinguishing installation, the pressure escapes through the inlet opening into the pressure equalization chamber. The control line thus remains unpressurized and does not trigger any faulty actuation. The safety device is conceived such that the closure element is displaced in the direction of the second terminal position and initiates a pressure equalization already at a minor pressure value of preferably 0.3 bar.

In one further embodiment of the control system according to the invention the closure element is preferably configured for at least partially closing the inlet opening when in the first terminal position. The closure element thus completely or at least partially closes the inlet opening. When the closure element closes the inlet opening a pressure equalization between the control line and the pressure equalization chamber is established only as from a pressure to be predefined in the control line. In the event of the closure element restricting, a continuous but inhibited pressure equalization takes place between the control line and the pressure equalization chamber as long as the control pressure is not prevalent in the control line.

In one further embodiment of the control system according to the invention the closure element is configured for permitting fluid communication between the inlet opening and an outlet opening of the pressure equalization chamber when the closure element is disposed between the first and the second terminal position. It is ensured in this way that a faulty pressure in the control line by way of the inlet opening of the pressure equalization chamber can escape through the outlet opening. A pressure equalization is thus established as long as the closure element is not disposed in the second terminal position.

In one further design embodiment of the control system according to the invention the closure element in the second terminal position is configured for closing the outlet opening of the pressure equalization chamber and, on account thereof, for preventing an escape of the pressure in the control line. When a pressure which corresponds to the control pressure for actuating the fire-extinguishing installation is established in the control line, the closure element thus prevents that pressure escapes from the outlet opening. The control pressure in the control line is thus maintained and can reliably actuate the fire-extinguishing installation.

One refinement of the control system according to the invention provides that the outlet opening is fluidically connected to the environment. A pressure equalization in the control line thus takes place by way of the environment.

One embodiment of the control system according to the invention provides that a guide sleeve for guiding the closure element is disposed in the housing. The closure element is reliably displaced to the correct terminal position by way of a guide. It is thus ensured in the second terminal position that the outlet opening is securely closed. And in the first terminal position it is ensured that the inlet opening is either restricted or closed. It is advantageous herein, for example, when the diameter of the pressure equalization chamber, or of the guide sleeve in which the closure element moves, respectively, is approximately 0.5 mm larger than the diameter of the closure element, so as to enable a resistance-free movement of the closure element.

In one further embodiment of the control system according to the invention a sealing element is disposed in front of the outlet opening in the pressure equalization chamber. The closure element is configured to bear in a fluid-tight manner on the sealing element when in the second terminal position. The sealing element, for closing the pressure equalization chamber in a pressure-tight manner in the control operation, interacts with the closure element. A tightness of the pressure equalization chamber in the control operation is thus guaranteed, and the continuity of the control pressure in the control line is guaranteed.

In one design embodiment of the control system according to the invention the holding element is configured as ring-shaped permanent magnet. A cost-effective and reliable construction of the control system is achieved on account thereof. Moreover, permanent magnets do not require any external power supply such that a reliable control is guaranteed even in the case of a power failure.

In one further design embodiment of the control system according to the invention the closure element has a convexly curved surface portion, preferably a partially spherical or spherical surface portion, wherein the surface portion is configured to bear in a fluid-tight manner on the sealing element when the closure element is in the second terminal position. A partially spherical or spherical surface portion has the property that the surface portion reliably interacts with an annular, round outlet opening, in a manner independent of any angle. A fluid-tight closure of the outlet opening is thus established in the interaction of the closure element with the sealing element.

One embodiment of the control system according to the invention provides that the safety device has a connection element for connecting the safety device to the control line to be in fluid communication, wherein the connection element has an inlet duct for the connection between the control line and the pressure equalization chamber. The safety device is connected to the control line by way of the connection element. On account thereof, a spacing between the connector of the safety device on the control line and the pressure equalization chamber is implemented. The inlet opening of the pressure equalization chamber is thus disposed so as to be separate from the connector to the control line such that a reliable operation of the safety device is guaranteed on account of this functional separation.

In one further embodiment of the control system according to the invention the holding element is disposed and clamped between the connection element and the guide sleeve. On account thereof, additional fastening elements for fixing the holding element are avoided, on account of which the construction is more cost-effective.

In one further embodiment of the control system the sealing element is preferably disposed and clamped between the guide sleeve and the housing. On account thereof, additional fastening elements for fixing the holding element are avoided, on account of which the construction is more cost-effective.

The invention achieves the underlying object thereof moreover by way of the features of the disclosed invention, directed toward a safety device for a control system for controlling a pneumatic or hydraulic fire-extinguishing installation, wherein the safety device is configured to being connected to a control line in fluid communication. The safety device according to the invention is associated with the same inventive concept and the same advantages as the control system described above. To this extent, reference is made to the preceding explanations. The safety device has the same preferred embodiments as the control system according to the invention.

In particular, the safety device for controlling a pneumatic or hydraulic installation, in particular a fire-extinguishing installation, has a pressure equalization chamber in which a holding element and a movable closure element are disposed, wherein the closure element is disposed in the pressure equalization chamber so as to be displaceable between a first terminal position and a second terminal position, and the holding element is configured for exerting on the closure element a restoring force in the direction of the first terminal position, wherein the restoring force acting on the closure element in the second terminal position of the closure element is higher than the weight force of the closure element, and in the first terminal position of the closure element is lower than a pressure force that during the control operation acts on the closure element as a function of the control pressure.

The holding element of the safety device preferably has a magnet, and the closure element is at least in part configured so as to be magnetic or capable of being magnetized.

In one preferred embodiment the safety device has a housing which has an inlet opening for implementing a fluidic connection to a control line of the installation to be controlled.

In one further preferred embodiment of the safety device the closure element in the first terminal position is configured for at least partially closing the inlet opening.

In another preferred embodiment of the safety device the closure element is configured for permitting a fluidic connection between the inlet opening and an outlet opening of the pressure equalization chamber when the closure element is disposed between the first and the second terminal position.

One design embodiment of the safety device preferably provides that the closure element in the second terminal position is configured for closing the outlet opening of the pressure equalization chamber and, on account thereof, for preventing an escape of the pressure from the pressure equalization chamber.

Another preferred design embodiment of the safety device provides that the outlet opening is fluidically connected to the environment.

In one further design embodiment of the safety device a guide sleeve for guiding the closure element is preferably disposed in the housing.

In one preferred embodiment of the safety device a sealing element is disposed in front of the outlet opening in the pressure equalization chamber, the closure element in the second terminal position bearing in a fluid-tight manner on said sealing element.

In another preferred embodiment of the safety device the holding element is configured as a ring-shaped permanent magnet.

In the case of one further embodiment of the safety device, the closure element preferably has a convexly curved face, preferably a partially spherical or spherical face, wherein the face is specified for bearing in a fluid-tight manner on the sealing element when the closure element is disposed in the second terminal position.

In one preferred embodiment the safety device has a connection element for fluidically connecting the safety device to the control line of the installation to be controlled, wherein the connection element has an inlet duct for the fluidic connection between the control line and the pressure equalization chamber.

In the case of one design embodiment of the safety device, the holding element is preferably disposed and clamped between the connection element and the guide sleeve.

In another preferred design embodiment of the safety device the sealing element is disposed and clamped between the guide sleeve and the housing.

BRIEF DESCRIPTION OF THE DRAWINGS

Exemplary embodiments of the present invention are now to be explained in more detail hereunder with reference to the appended drawing in which:

FIG. 1 shows a schematic cross-sectional view of an embodiment of the control system according to the invention.

MODE(S) FOR CARRYING OUT THE INVENTION

The control system 10 comprises a control line 11 and a safety device 12. The safety device 12 is in fluid communication with connected to the control line 11. This means that a fluid for controlling a fire-extinguishing installation can flow from the control line 11 into the safety device 12. To this end, the safety device 12 has a connection element 4. An inlet duct 9 is configured in the connection element 4. The connection element 4 is coupled to a housing 1 of the safety device 12.

A pressure equalization chamber 13 is disposed in the housing 1. The pressure equalization chamber 13 is in fluid communication with the inlet duct 9 and thus also to the control line 11. An outlet opening 7 leads out of the pressure equalization chamber 13. The outlet opening 7 is in fluid communication with connected to the environment of the safety device 12. A pressure prevailing in the control line 11 can thus escape into the environment by way of the inlet duct 9, the pressure equalization chamber 13, and the outlet opening 7. The pressure equalization chamber 13 thus permits a pressure equalization between the control line 11 and the environment. On account thereof, the pressure in the control line 11 drops.

A closure element 2 is disposed in the housing 1, or in the pressure equalization chamber 13 of the safety device 12, respectively. The closure element 2 in the embodiment shown is configured as a spherical member. The closure element 2 is capable of being movably disposed so as to be displaceable between a first terminal position and a second terminal position. The closure element 2 in FIG. 1 is disposed in the first terminal position.

The closure element 2 between the first terminal position and the second terminal position is guided by a guide sleeve 5 that is likewise disposed in the housing. The guide sleeve 5 delimits the pressure equalization chamber 13 in terms of the diameter thereof. The guide sleeve 5 is to be conceived such that the closure element 2 is movable without resistance. It is expedient for the diameter of the pressure equalization chamber 13, or of the guide sleeve 5, respectively, to be chosen so as to be approximately 0.5 mm larger than the external dimension of the closure element 2. The diameter of the guide sleeve 5 is also to be conceived for a respective mass flow of control fluid to be expected, said mass flow being created in the case of an acceptable faulty pressure in the control line 11.

The closure element 2 in the first terminal position is disposed so as to bear on a holding element 3. The holding element 3 is configured as a ring-shaped member and has an opening which defines an inlet opening 8 of the housing 1 of the safety device 12 into the pressure equalization chamber 13. The inlet opening 8 is aligned so as to be concentric with the inlet duct 9 of the connection element 4. The holding element 3 is configured for exerting a restoring force on the closure element 2. The holding element 3 in the embodiment shown is configured as a ring-shaped permanent magnet. The closure element 2 is at least in part configured so as to be a magnetic member or a member capable of being magnetized. One embodiment provides that the closure element 2 is made of steel. Alternatively, it is provided that the closure element 2 is made from ferritic stainless steel. A force, in this case a magnetic force, consequently acts between the holding element 3 and the closure element 2.

The force is configured such that said force exerts on the closure element 2 a force acting in the direction of the first terminal position. Accordingly, when the closure element 2 is displaced from the first terminal position, the force has the effect that the closure element 2 by virtue of the force is displaced back to the first terminal position. The field force, or the restoring force, respectively, of the holding element is to be conceived as a function of the largest spacing which is created between the closure element 2 and the holding element 3, since a magnetic force decreases as the spacing between the members increases. When the closure element 2 is disposed in the second terminal position, the restoring force of the holding element 3 is higher than the weight force of the closure element 2. The closure element 2 thus also moves from the second terminal position back to the first terminal position even when the safety device 12 is installed upside down, the first terminal position accordingly being disposed above the second terminal position when viewed in spatial manner.

At the same time, the restoring force is also to be conceived such that said restoring force is lower than a force that on account of the control pressure acts on the closure element 2, in order for the closure element 2 to remain in the second terminal position when the control pressure in the control line 11 exerts a force on the closure element 2. In the case of some applications, the control pressure in the control line 11 can be up to 300 bar. However, when the pressure in the control line 11 is lower than the control pressure, the closure element 2 must not be moved up to the second terminal position. Otherwise, the outlet opening 7 would be closed and the pressure in the control line 11 would further rise, on account of which a faulty actuation of the fire-extinguishing installation can be triggered.

The restoring force is also to be conceived with a view to a limit pressure in the control line 11. The limit pressure is considered to be that pressure as from which a force acting on the closure element 2 is higher than the restoring force in the first terminal position. In the event of the limit pressure prevailing in the control line 11, the force initiated by the limit pressure is consequently identical to the restoring force in the first terminal position. A higher pressure than the limit pressure thus moves the closure element 2 out of the first terminal position.

The holding element 3 is clamped between the connection element 4 and the guide sleeve 5. A first surface portion 14 of the closure element 2 in the first terminal position at least partially closes the inlet opening 8. A continuous pressure equalization from the control line 11 can thus take place until the pressure in the control line 11 exceeds a limit value. When such a limit value is exceeded, the closure element 2 moves out of the first terminal position.

Alternatively however, the closure element 2 can also close the inlet opening 8. On account thereof, no continuous pressure equalization initially takes place, but takes place only once a pressure to be predefined is reached or exceeded, respectively. When the pressure increases up to the control pressure, the closure element 2 moves to the second terminal position.

As long as the closure element 2 is disposed between the first and the second terminal position, a fluidic connection from the control line 11 to the outlet opening 7 is provided. The closure element 2 thus permits a fluid communication when the closure element 2 is disposed between the first and the second terminal position.

When the closure element 2 is disposed in the second terminal position, said closure element 2 closes in a fluid-tight manner the inlet opening 7 of the pressure equalization chamber 13. No fluid can thus escape from the pressure equalization chamber 13. The pressure in the control line 11 is maintained on account thereof.

To this end, a sealing element 6 is disposed in front of the outlet opening 7 in the outflow direction of the fluid. The sealing element 6 is configured as a ring-shaped member. The sealing element 6 is clamped between the housing 1 and the guide sleeve 5. The closure element 2 in the second terminal position bears in a fluid-tight manner on the sealing element 6. A second surface portion 15 of the closure element 2 interacts with the sealing element 6 so as to close in a pressure-tight manner the pressure equalization chamber 13 in the control operation, that is when the control pressure prevails in the control line 11.

To this end, the second surface portion 15 of the closure element 2 is preferably configured so as to be convex, in particular partially spherical to provide a partially spherical peripheral face. The partially spherical peripheral face has the advantage that an uninterrupted line is conjointly formed with the ring-shaped sealing element 6 in any arbitrary position of the closure element 2, on account of which the pressure equalization chamber 13 is closed in a pressure-tight manner. No pressure thus escapes from the control line 11 when the closure element 2 bears in the second terminal position.

For the sake of completeness, the functioning of the control system 10 for a fire-extinguishing installation is to be described hereunder by means of operating states. In order for a pressure to be built up in the control system 10, the control system 10 is coupled to a pressure accumulator, for example. In a first operating state, a passive operation, the control line 11 is to be unpressurized, that is to say that no pressure prevails in the control line 11. In a second operating state, a control operation, the fire-extinguishing installation is to be actuated, that is to say that the control line 11 with the aid of the pressure vessel is subjected to a control pressure. The control line in the normal case accordingly has two pressurized states: a resting pressure or unpressurized, respectively, and a control pressure.

The pressure accumulator in a leakage state has a leak and is leaky. The control line 11 in this state is subjected to a pressure which is between the passive operation pressure and the control pressure. This pressure is referred to as a faulty pressure.

The closure element 2 in the passive operation is disposed in the first terminal position. The control line 11 is unpressurized.

In the leakage state, control fluid escapes from the pressure accumulator and accumulates in the control line 11. On account thereof, a faulty pressure is built up in the control line 11. Said faulty pressure is unwarranted and must not in any case reach the control pressure so as to avoid an unwanted actuation of the fire-extinguishing installation. In order for this to be prevented, the control fluid can flow into the safety device 11. The mass flow of the control fluid effects a force on the control element 2 and moves the latter out of the first terminal position. On account thereof, a fluid communication between the control line 11, the inlet duct 9, the inlet opening 8, the pressure equalization chamber 13, and the outlet opening 7 is established with the environment. The control fluid can thus escape into the environment. On account thereof, the pressure in the control line 11 drops, on account of which any faulty actuation is avoided.

The restoring force which acts from the holding element 3 onto the closure element 2 has the effect that the closure element 2 on account of the faulty pressure is not displaced to the second terminal position and closes in a pressure tight-manner the pressure equalization chamber 13 such that the no pressure can continue to be built up in the control line 11. Even in an extreme case in which the control installation 12 is connected to the control line 11 upside down, the restoring force counters gravity and deters the closure element 2 from being displaced to the second terminal position. The restoring force also has the effect that the closure element 2, after the pressure equalization has taken place, is displaced back to the first terminal position and therein is held by the holding element 3.

The control line 11 is subjected to the control pressure when the fire-extinguishing installation is to be actuated. The mass flow of control fluid effects a force on the control element 2, said force counter to the restoring force displacing the closure element 2 to the second terminal position. The closure element 2 in the second terminal position closes in a pressure-tight manner the outlet opening 7 by way of an interaction of the second surface portion 15 with the sealing element 6. No pressure equalization takes place with the environment. The control pressure in the control line 11 is maintained.

The functioning of the safety device 12 is independent of the installed position thereof. This is achieved by the use of magnetic materials for the holding element 3 and the closure element 2, on account of which a force is exerted from one element on the respective other element. Said magnetic force acts universally and thus independently of the mutual position of the elements.

An alternative to the aforedescribed embodiment could accordingly provide that the holding element 3 does not attract the closure element 2 but repels the latter in the direction of the first terminal position.

LIST OF UTILIZED REFERENCE NUMBERS

1 Housing
2 Closure element
3 Holding element
4 Connection element
5 Guide sleeve
6 Sealing element
7 Outlet opening
8 Inlet opening
8 Inlet duct
10 Control system
11 Control line
12 Safety device
13 Pressure equalization chamber
14 First surface portion
15 Second surface portion

The invention claimed is:

1. A control system of a fire-extinguishing installation, comprising:
   at least one fire-extinguishing installation control line for controlling a control procedure of the fire-extinguishing installation, wherein the at least one fire-extinguishing installation control line in a passive operation is unpressurized and the at least one fire-extinguishing installation control line in a control operation is subjected to a control pressure; and
   a safety device in fluid communication with the at least one fire-extinguishing installation control line, having a pressure equalization chamber in which a holding element and a movable closure element are disposed,
   wherein the closure element is disposed in the pressure equalization chamber so as to be displaceable between a first terminal position and a second terminal position;
   wherein the holding element is configured for exerting on the closure element a restoring force in a direction of the first terminal position,
   wherein the restoring force acting on the closure element in the second terminal position of the closure element is higher than a weight force of the closure element, and in the first terminal position of the closure element is lower than a pressure force that during the control operation acts on the closure element as a function of the control pressure,
   wherein the safety device comprises a housing having an inlet opening located between the pressure equalization chamber and the control line, and the pressure equalization chamber comprises an outlet opening,
   wherein the closure element in the first terminal position is configured to close the inlet opening; and
   wherein the closure element in the second terminal position is configured to close the outlet opening of the pressure equalization chamber and prevent an escape of the control pressure in the control line.

2. The control system as claimed in claim 1, wherein the holding element has a magnet, and the closure element is at least in part configured so as to be magnetic or capable of being magnetized.

3. The control system as claimed in claim 2, wherein the holding element comprises an opening that defines the inlet opening located between the pressure equalization chamber and the control line.

4. The control system as claimed in claim 3, wherein a guide sleeve for guiding the closure element is disposed in the housing.

5. The control system as claimed in claim 4, wherein the safety device has a connection element for fluidically connecting the safety device to the control line to be in fluid communication, wherein the connection element has an inlet duct for the connection between the control line and the pressure equalization chamber.

6. The control system as claimed in claim 5, wherein the holding element is disposed and axially clamped between the connection element and the guide sleeve.

7. The control system as claimed in claim 1, wherein the closure element is configured for permitting fluid communication between the inlet opening and the outlet opening of the pressure equalization chamber when the closure element is disposed between the first and the second terminal positions.

8. The control system as claimed in claim 7, wherein the closure element in the second terminal position is configured for closing in a fluid-tight manner the outlet opening of the pressure equalization chamber and for preventing an escape of the control pressure in the control line.

9. The control system as claimed in claim 7, wherein the outlet opening is fluidically connected to an environment.

10. The control system as claimed in claim 8, wherein a sealing element is disposed in front of the outlet opening in the pressure equalization chamber, the closure element being configured to bear in the fluid-tight manner on the sealing element when in the second terminal position.

11. The control system as claimed in claim 10, wherein the holding element is configured as a ring-shaped permanent magnet.

12. The control system as claimed in claim 10, wherein the closure element has a partially spherical, surface portion, wherein the surface portion is configured to bear in the fluid-tight manner on the sealing element when the closure element is in the second terminal position.

13. The control system as claimed in claim 1, wherein a sealing element is disposed in front of the outlet opening in the pressure equalization chamber, a guide sleeve for guiding the closure element is disposed in the pressure equalization chamber, and wherein the holding element, the guide sleeve, and the sealing element are provided in series in the pressure equalization chamber and axially clamped within the pressure equalization chamber of the housing by a connection element that fluidically connects the safety device to the control line.

14. A safety device for a control system for controlling a pneumatic or hydraulic fire-extinguishing installation, wherein the safety device is configured to be connected to a fire extinguishing installation control line in fluid communication, said safety device comprising:
 a housing having an inlet opening and a pressure equalization chamber, the pressure equalization chamber having an outlet opening; and
 a holding element and a movable closure element disposed in the pressure equalization chamber, wherein the closure element is disposed in the pressure equalization chamber so as to be displaceable between a first terminal position and a second terminal position; and
 a connection element coupled to the housing for fluidically connecting the safety device to the control line, wherein the connection element has an inlet duct for the connection between the control line and the pressure equalization chamber,
 wherein the holding element is configured for exerting on the closure element a restoring force in a direction of the first terminal position,
 wherein the restoring force action on the closure element in the second terminal position of the closure element is higher than a weight force of the closure element, and in the first terminal position of the closure element is lower than a pressure force that during a control operation acts on the closure element as a function of the control pressure,
 wherein the closure element in the first terminal position is configured to close the inlet opening and in the second terminal position is configured to close the outlet opening,
 wherein the holding element comprises a magnet,
 wherein a guide sleeve axially clamps the magnet in the pressure equalization chamber,
 wherein a sealing element is disposed in front of the outlet opening in the pressure equalization chamber,
 wherein the sealing element, the guide sleeve and the holding element are provided in series within the pressure equalization chamber and clamped to the housing by the connection element, and
 wherein the guide sleeve comprises an inner surface with a constant diameter.

15. The safety device of claim 14, wherein the closure element in the second terminal position closes the outlet opening in a fluid-tight manner.

16. The safety device of claim 14, wherein the closure element is configured for permitting fluid communication between the inlet opening and the outlet opening of the pressure equalization chamber when the closure element is disposed between the first and the second terminal positions.

17. The safety device of claim 16, wherein the closure element comprises a spherical surface portion and the magnet comprises a ring-shaped permanent magnet.

18. The safety device of claim 17, wherein the connection element has an inlet duct aligned with the inlet opening and axially clamps the ring-shaped permanent magnet.

19. The safety device of claim 18, wherein the ring-shaped permanent magnet has an opening that defines the inlet opening.

* * * * *